US008044669B2

(12) United States Patent
Palata et al.

(10) Patent No.: US 8,044,669 B2
(45) Date of Patent: Oct. 25, 2011

(54) ADMITTANCE METER FOR MONITORING A MEDIUM

(75) Inventors: Jaromir Palata, Friedrichshafen (DE); Jochen Gundlach, Wasserburg (DE)

(73) Assignee: ifm electronic GmbH, Essen (DE)

( * ) Notice: Subject to any disclaimer, the term of this patent is extended or adjusted under 35 U.S.C. 154(b) by 356 days.

(21) Appl. No.: 12/482,638

(22) Filed: Jun. 11, 2009

(65) Prior Publication Data
US 2010/0313653 A1    Dec. 16, 2010

(51) Int. Cl.
*G01R 27/04* (2006.01)
*B67D 7/14* (2010.01)
*G01F 23/26* (2006.01)
(52) U.S. Cl. .......... 324/634; 324/640; 222/66; 73/304 C
(58) Field of Classification Search .................. 324/634, 324/636, 637, 640, 648; 73/304 C; 222/66; 250/573
See application file for complete search history.

(56) References Cited

U.S. PATENT DOCUMENTS
4,047,100 A * 9/1977 Robinson ...................... 324/443
* cited by examiner

*Primary Examiner* — Melissa Koval
*Assistant Examiner* — Farhana Hoque
(74) *Attorney, Agent, or Firm* — MacMillan, Sobanski & Todd, LLC

(57) ABSTRACT

An admittance meter having an electrical alternating signal source, a diode ring operated as a synchronous rectifier with at least four diodes connected in series and in the same direction in succession, a measuring sensor, and an evaluation unit. The diode ring is subjected to an alternating signal via first second feed points, which are each connected via two series-connected diodes. The measuring sensor is connected to the first feed point, and the evaluation unit is connected to a first or a second measurement point of the diode ring. The first and second measurement points are each connected via one diode to the first and second feed points, respectively.

15 Claims, 10 Drawing Sheets

ADMITTANCE METER FOR MONITORING A MEDIUM

BACKGROUND OF THE INVENTION

1. Field of the Invention

This invention relates to an admittance meter for monitoring a medium in a fill level sensor.

2. Description of the Prior Art

The invention relates to an admittance meter for monitoring a medium for a fill level sensor, having at least one electrical alternating signal source, a diode ring operated as a synchronous rectifier with at least four diodes connected in series and in the same direction in succession, a measuring sensor, and an evaluation unit, in which the diode ring can be subjected to an alternating signal is via a first feed point and a second feed point, and the first feed point and the second feed point are each connected via two series-connected diodes of the diode ring, the measuring sensor is connected to the first feed point, and the evaluation unit is connected to a first measurement point of the diode ring and/or to a second measurement point of the diode ring, and in which the first measurement point and the second measurement point are each connected via one diode of the diode ring to the first feed point and the second feed point, respectively.

For many years, admittance meters for fill level sensors have been known in which the measuring principle is based on the fact that the variable fill level of a defined medium in a volume to be monitored affects the measuring sensor employed, and more precisely varies the admittance that is detectable by the measuring sensor. Usually, the measuring sensor is opened electrically into the volume to be monitored or in other words when a capacitive measurement principle is employed has an active, triggered electrode, and an electrical stray field from the active electrode of the measuring sensor extends into the surroundings. The capacitance of the capacitor formed by the active electrode of the measuring sensor and the variable surroundings is then dependent on the fill level to be detected of the medium, just as it is dependent on the electrical material properties of the medium (such as the dielectric constant).

When the measuring sensor of the alternating signal source is subjected to an alternating signal, such an alternating voltage, then it is readily understandable that the measuring current—in the case of the capacitive measuring sensor, the charging and discharging current of the measuring capacitor—is a function of the variable admittance of the measuring sensor, namely the admittance that is dependent on the fill level of the medium. By measuring the current established, a conclusion can be drawn about the admittance of the measuring sensor and thus in turn about the fill level or a change in the fill level but also about the conductivity and the dielectric constant of the medium that is present.

From German Patent Disclosure DE 43 22 867 A1, an admittance meter is known which is not used in conjunction with a fill level sensor but rather serves the purpose of contactless detection of gear wheels of a gear wheel in order to ascertain the position and rotation of the gear wheel. Here, the measuring sensor comprises an active electrode of a capacitor, the electrode being subjected to an alternating signal from the alternating signal source, and the counterelectrode is formed by the gear wheels of the gear wheel. The measuring sensor thus formed is connected to a diode ring operated as a peak-value rectifier, in that the alternating signal source subjects not only the measuring sensor but simultaneously a first feed point and a second feed point of the diode ring to an alternating signal. At a measurement point of the diode ring, a charging or discharging current that is due to the charging and discharging of the capacitors is then picked up, and the modulation frequency of an output signal, furnished by the evaluation unit, serves as a measure for the rpm of the gear wheel. The disposition is advantageous because, as a result of the symmetry of the diode ring operated as a peak value rectifier, the effects of temperature drift of the conducting-state diode voltages cancel one another out. This measuring circuit is suitable for detecting a rapidly varying admittance of the measuring sensor but is not suitable for detecting an only slowly varying admittance of the measuring sensor, of the kind that is the case in many fill level measuring tasks. In fill level measuring tasks, it is therefore—as described at the outset—the amplitude of a measuring signal that is evaluated, not its frequency—which is dependent on the variation of the test subject.

In detail, there are now various possibilities for embodying and refining the admittance meter of the invention. To that end, reference is made to the claims and to the description of preferred exemplary embodiments in conjunction with the drawings. In the drawings:

SUMMARY OF THE INVENTION

The admittance meter according to the invention is characterized primarily and essentially in that the measuring sensor is embodied as a resonator.

The amplitude response of a simple resonator—for instance, a simple electric oscillating circuit that has the transmission performance of a second order system—exhibits an excessive increase in voltage or current in the range of the resonant frequency, and this excessive increase in voltage or current rapidly decreases with increasing spacing and frequency from the resonant frequency; the amplitude response exhibits a typical bell shape.

If the measuring sensor embodied as a resonator is affected by a varying fill level, by accumulations of medium at the measuring sensor, or by changes in the conductivity or dielectric constant, then the resonant frequency of the resonator necessarily changes as well. The change in frequency in turn, given an unchanged subjection of the alternating signal to the measuring sensor, leads to a change in the amplitude of the current—the resonator is mistuned—that flows from the diode ring via the first feed point of the diode ring into the resonator and from the resonator into the diode ring. The diode ring, operated as a synchronous rectifier, which is connected on the one hand via the first feed point to the electrical alternating signal source and on the other via the first feed point to the resonator, has two effects: First, the one, "negative" half-wave of the alternating signal makes the first of the two diode paths, located between the first feed point and the second feed point, conductive. Second, the other, "positive" half-wave makes the diode path of the diode ring located between the first feed point and the second feed point conductive. All in all, this means that in the one case the resonator current can be picked up via the first measurement point between the two diodes in the first diode path of the diode ring, and in the other case the resonator current can be picked up via the second measurement point between the two diodes of the second diode path of the diode ring. The resonator currents flowing via the two diode paths are the same, given a symmetrical construction of the diode ring, and can be evaluated separately or together by the evaluation unit.

In contrast to the known admittance meters, the admittance meter of the invention or in other words the measuring sensor of the admittance meter of the invention comprises not simply an arrangement whose capacitance or inductance varies as a result of interactions with the surroundings to be detected; instead, the measuring sensor itself is an oscillatable measurement system having the appropriate special features of electrically oscillatable systems, such as the increase in amplitude of signals involved in the resonant range of the resonator.

In an advantageous feature of the invention, the resonator is embodied as tunable, so that the resonant frequency of the resonator is adjustable and in particular can be adjusted such that in an important state of manipulation of the measuring sensor, a resonance is present. Especially then, it is assured that even slight differences in the state of manipulation of the measuring sensor can be detected by a change in the resonator current.

In this connection, it is especially advantageous if the frequency of the alternating signal generated by the alternating signal source corresponds to the resonant frequency of the resonator, or in other words the resonator is excited with its resonant frequency—which belongs to a defined state of manipulation—and this leads to maximum measurement signals. In this variant of the admittance meter of the invention, a change in the resonant frequency of the variably manipulated resonator can be ascertained only via the amplitude of the resonator current.

It is advantageous if the measuring sensor embodied as a resonator is operated at its resonant frequency, and preferably a frequency range is traversed that includes both the resonant frequency in the undamped, untuned state and the resonant frequencies in the damped, tuned state of the resonator.

In a further advantageous feature of the invention, the alternating signal source is designed such that the frequency of the alternating signals of the alternating signal source can be predetermined—preferably in a desired range and the alternating signal can in particular traverse a frequency range. In this embodiment, the alternating signal source is simultaneously operated as a wobble generator. In this embodiment, the possibility exists of picking up the amplitude response of the resonator current, detectable via the first measurement point and/or the second measurement point, and of determination of the parameters of the amplitude response by the evaluation unit. The outcome of this evaluation is the knowledge of various parameters of the resonator. Elementary parameters are for instance the current resonant frequency of the resonator and its quality; a high quality of the resonator leads to a great flank steepness of the amplitude response in the range of the resonant frequency, and a poor quality leads to a very broad amplitude response of the resonant current, with only slight flank steepness in the range of the resonant frequency.

These findings about the resonator make a wide range of interpretation possible for the state of manipulation of the measuring sensor embodied as a resonator. For instance, it has been found that an accumulation of medium at the measuring sensor leads to a very poor quality of the resonator (low current amplitude at resonant frequency and broad amplitude response), while conversely, if the measuring sensor is surrounded by a large volume of the same medium, the result is high-quality resonance behavior (high resonator current amplitude and great flank steepness). The ascertained resonant frequency itself opens up the possibility of knowing what the influential medium is or of distinguishing between different media, such as distinguishing a water volume from a volume of catsup and from a volume of air. A special application of the admittance meter of the invention is its use for monitoring media, in particular coolant lubricants. Since in this application the measuring sensor is constantly covered by the medium that is present, the electrical properties, such as the conductivity and the dielectric constant, become measurement variables that can be determined. In the case of coolant lubricants, these are indicators for the proportion of oil and the degree of contamination of the emulsion.

In a further advantageous embodiment of the invention, a further resonator, namely a reference resonator, is connected to the first feed point. In order to be able to act as a reference, the reference resonator is essentially incapable of being manipulated electrically from outside, and in particular of being manipulated by the medium that is capable of manipulating the measuring sensor embodied as a resonator. Preferably, the resonant frequency of the reference resonator is selected such that it deviates from the resonant frequency of the measuring sensor embodied as a resonator, and preferably the resonant frequency of the reference resonator is lower than that of the resonator. This mistuning of the two resonators is intentional, to enable distinguishing the resonators from one another, in particular on the basis of their contributions to a common frequency response/amplitude response.

Preferably, the resonant frequency of the reference resonator is selected such that it is located outside the range of resonant frequencies of the resonator that is attainable by means of various states of manipulation of the measuring sensor. As a result, it is reliably avoided that the resonant frequency of the resonator could be mistaken for the resonant frequency of the reference resonator. If preferably the reference resonator has essentially the same components as the measuring sensor embodied as a resonator, then the reference resonator at the same time represents a parallel model of the resonator, at which changes can be observed that cannot have been caused by external manipulation of the measuring sensor.

In a further embodiment of the admittance meter of the invention, the reference resonator is connected to the second feed point of the diode ring, and in this case, the contribution of the reference resonator to the amplitude response of the total resonator current is an excessive increase in amplitude pointing in the opposite direction. The reference resonator at the second feed point of the diode ring, or in other words the current signal caused by this reference resonator, can be used for the evaluation unit as a reference for calculating the drift of the diodes, the alternating signal source, the coils employed, and so forth. Here as well, it is appropriate to select the resonant frequency of the measuring sensor embodied as a resonator and the resonant frequency of the reference resonator differently, so that their contributions to the amplitude response can be detected independently of one another.

In a further advantageous embodiment of the invention, the evaluation unit is embodied as a current measuring circuit, and the evaluation circuit in particular evaluates the maximum currents or in other words the frequency response of the maximum currents, as has already been explained quite generally above. To that end, it is advantageous if the first measurement point of the diode ring is connected to ground via a first capacitor and/or the second measurement point of the diode ring is connected to ground via a second capacitor, or in other words, because of the low-impedance input of the current measuring circuit, the currents drawn via the measurement points lead to a capacitor voltage of virtually 0 volts.

In a very particularly preferred exemplary embodiment of the admittance meter, the resonator is embodied as a $\gamma/4$ resonator. This has the advantage that at the first feed point of the diode ring, with which the resonator is connected, maximum current is present, and on the other end, remote from the first feed point, of the resonator, maximum voltage is present, which is advantageous for instance whenever an electrical field is broadcast via an active capacitor electrode into the exterior of the measuring sensor.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
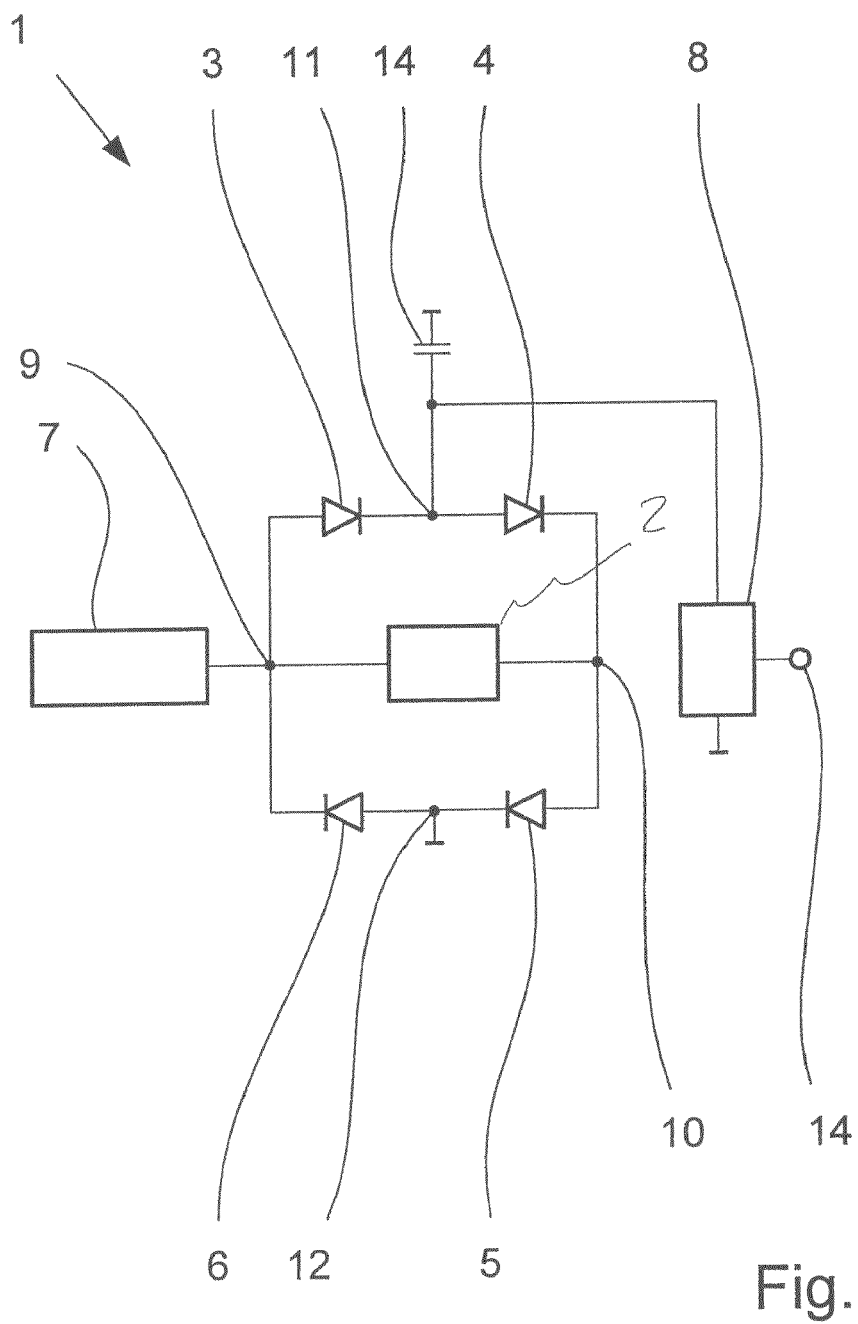
FIG. 1 is a schematic illustration of a first exemplary embodiment of an admittance meter of the invention.
Figure 2:
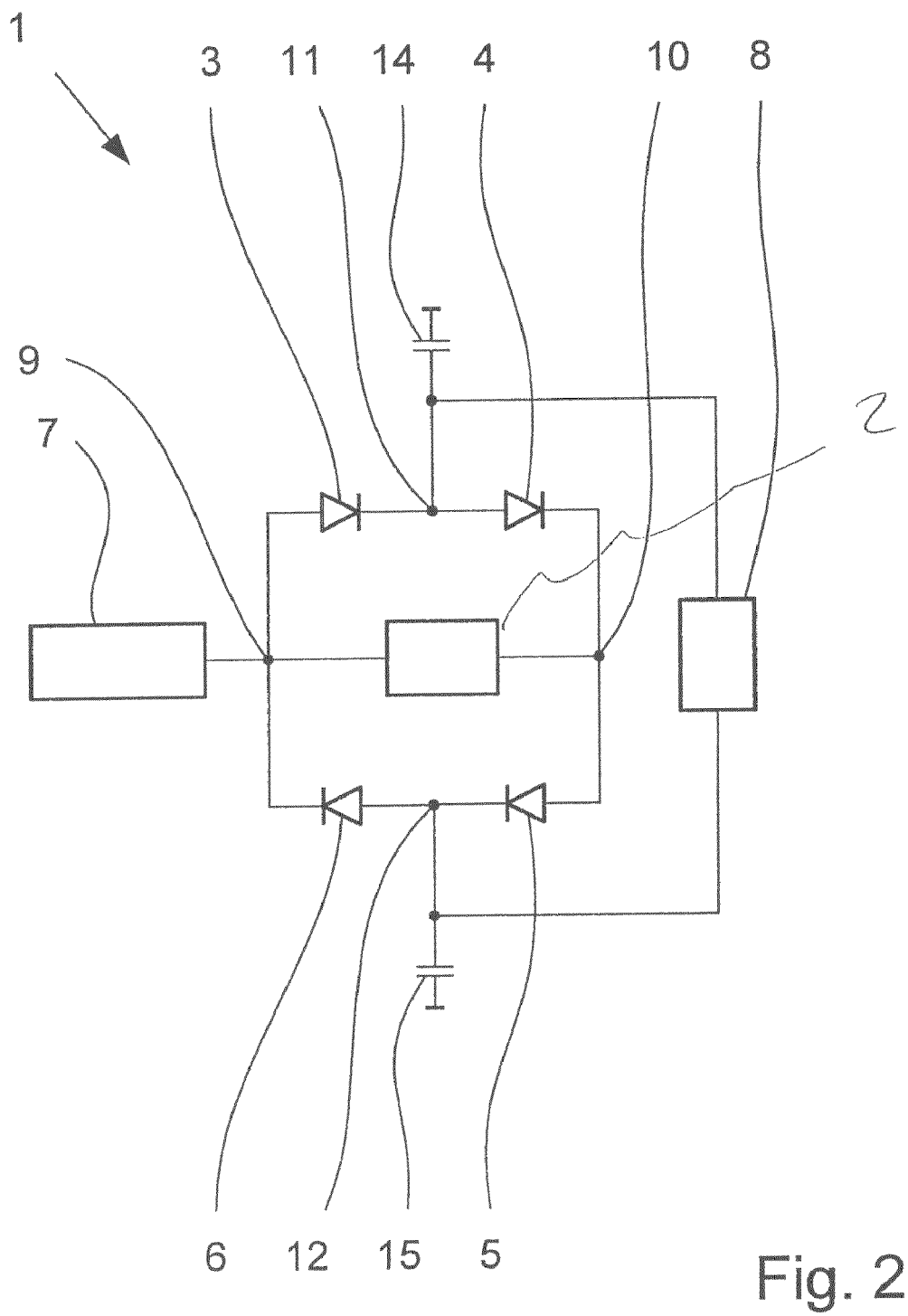
FIG. 2 is a further schematic illustration of an exemplary embodiment of an admittance meter of the invention.

In FIGS. 1 through 5, in every case an admittance meter 1 is shown, with an electrical alternating signal source 2, a diode ring operated as a synchronous rectifier and having four diodes 3, 4, 5, 6 connected in series and in the same direction in succession, a measuring sensor 7, and an evaluation unit 8. A diode ring comprising four diodes 3, 4, 5, 6 connected in series and in the same direction in succession is intended to mean a closed serial arrangement of the diodes 3, 4, 5, 6, in which the cathode of the first diode 3 is connected conductively to the anode of the second diode 4, the cathode of the second diode 4 is connected conductively to the anode of the third diode 5, the cathode of the third diode 5 is connected conductively to the anode of the fourth diode 6, and finally, the cathode of the fourth diode 6 is connected conductively to the anode of the first diode 3.

The diode ring can be subjected to an alternating signal by means of the alternating signal source 2, via a first feed point 9 and a second feed point 10, and in the present case the alternating signal is always a square wave signal train. The first feed point 10 is located at the connection between the anode of the first diode 3 and the cathode of the fourth diode 6, and the second feed point is located at the connection between the cathode of the second diode 4 and the anode of the third diode 5.

The first feed point 9 and the second feed point 10 therefore divide the diode ring into two current guide paths or diode paths; the first diode path allows current guidance via the first diode 3 and the second diode 4, and the second diode path allows current guidance via the third diode 5 and the fourth diode 6. As a result, in each case the first feed point 9 and the second feed point 10 are spaced apart via two each series-connected diodes of the diode ring. Depending on the polarity of the voltage generated by the alternating signal source 2 and output to the first feed point 9 and the second feed point 10, either the first path of the diode ring or the second path of the diode ring is made conducting.

It is common to all the exemplary embodiments that the measuring sensor 7 is connected to the first feed point 9 of the diode ring, and the evaluation unit 8 is connected at least to a first measurement point 11 of the diode ring and—depending on the exemplary embodiment—also with a second measurement point 12 of the diode ring. The first measurement point 11 and the second measurement point 12 are each spaced apart via a diode of the diode ring from the first feed point 9 and the second feed point 10, respectively. The first measurement point 11 is located at the connection between the cathode of the first diode 3 and the anode of the second diode 4, and the second measurement point 12 is located at the connection between the cathode of the third diode 5 and the anode of the fourth diode 6. The admittance meters 1 shown in FIGS. 1 through 5 are now distinguished by the fact that the measuring sensor 7 is embodied as a resonator, and in the present cases, the resonator is tunable.

As was explained at the beginning, the resonator is subjected to an alternating signal by the alternating signal source 2 and excited to an oscillation; the oscillating current, flowing in the resonator and varying over time, is also perceptible via the first path of the diode ring or the second path of the diode ring, and the polarity of the alternating signal decides which of the two paths of the diode ring is made conducting. Via the first measurement point 11 and/or the second measurement point 12, the resonator current can be detected and delivered to the evaluation unit 8. It is shown in FIG. 1 that the evaluation unit 8 is connected solely to the first measurement point 11 of the diode ring, while conversely in the other exemplary embodiments in the other drawings, a connection of the evaluation unit 8 to both measurement points 11, 12 is realized.

In the exemplary embodiments shown, the measuring sensor 7 embodied as a resonator has an actively triggered electrode of a capacitor, and the other "electrode" of the capacitor is formed by the surroundings of the measuring sensor 7. The surroundings are not shown as such in the drawings; instead, the arrangement with capacitance, formed of the active electrode of the measuring sensor 7 and the surroundings, is always shown with the switching sign for a capacitor. The actively triggered electrode inside the measuring sensor 7 broadcasts an electrical alternating field into the surroundings, and the capacitance of the thus-formed capacitor also depends on the surroundings. If the surroundings for instance comprise a fillable tank, then the capacitance of the measuring capacitor depends on how full the tank is and also on the dielectricity of the medium with which the tank is filled. By way of the variation in the capacitance of the measuring capacitor formed by the electrode of the measuring sensor 7 and by the surroundings, the resonant frequency of the resonator is varied, which in turn makes itself felt in a change in the resonator current. This current signal is evaluated via the evaluation unit 8.

In FIG. 1, the admittance meter 1 is embodied as a fill level switch and can output a switching signal via a terminal 14, which for instance actuates a switching device, not shown.

In the exemplary embodiment of FIG. 1, the frequency of the alternating signal generated by the alternating signal source 2 corresponds to the resonant frequency of the resonator, so that the resonator—in any case in a defined state of manipulation—oscillates in resonance. If the state of manipulation of the measuring sensor 7 and thus of the resonator changes, then its resonant frequency also changes, and the resonator—given an unchanged frequency of the alternating signal—is no longer excited with its resonant frequency, and this is expressed in a decreasing amplitude of the resonator current. In that case, the evaluation unit 8 evaluates solely the amplitude of the resonator current at a fixed excitation frequency and for instance detects deviations from a previously set value of the resonator current.

In the exemplary embodiments shown in FIGS. 2 through 5, the alternating signal source 2 is embodied such that the frequency of the alternating signals of the alternating signal source 2 can be predetermined; in the present cases, the alternating signal generated can traverse a frequency range. This allows the current of the resonator to be determined not only upon excitation at a single frequency; instead, the frequency response/amplitude response of the resonator current can be detected by the evaluation unit 8. This type of evaluation makes a very conclusive detection of the frequency dependency of the admittance of the resonator and thus of the state of manipulation of the measuring sensor 7 possible.

It is common to all the exemplary embodiments shown in FIGS. 1 through 5 that the evaluation unit 8 is designed as a current measuring circuit, and the evaluation circuit in particular evaluates the maximum currents—that is, the maximum currents of the resonator current—or the frequency response of these maximum currents, and the first measurement point 11 of the diode ring is connected in each case to the ground of the circuit via a first capacitor 14. The resonator current flowing either via the first path of the diode ring or the second path of the diode ring consequently charges the first capacitor 14 as a function of the magnitude of the resonator currents. In the exemplary embodiments of FIGS. 2 through 5, the second measurement point 12 of the diode ring is connected to ground via a second capacitor 15, and consequently the resonator current flowing via the second path of the diode ring charges the second capacitor 15 as a function of the magnitude of the resonator currents. In the case of low-impedance current evaluation of the resonator currents, the voltage at the capacitors 14, 15 tends toward 0 volts, however.

Figure 4:
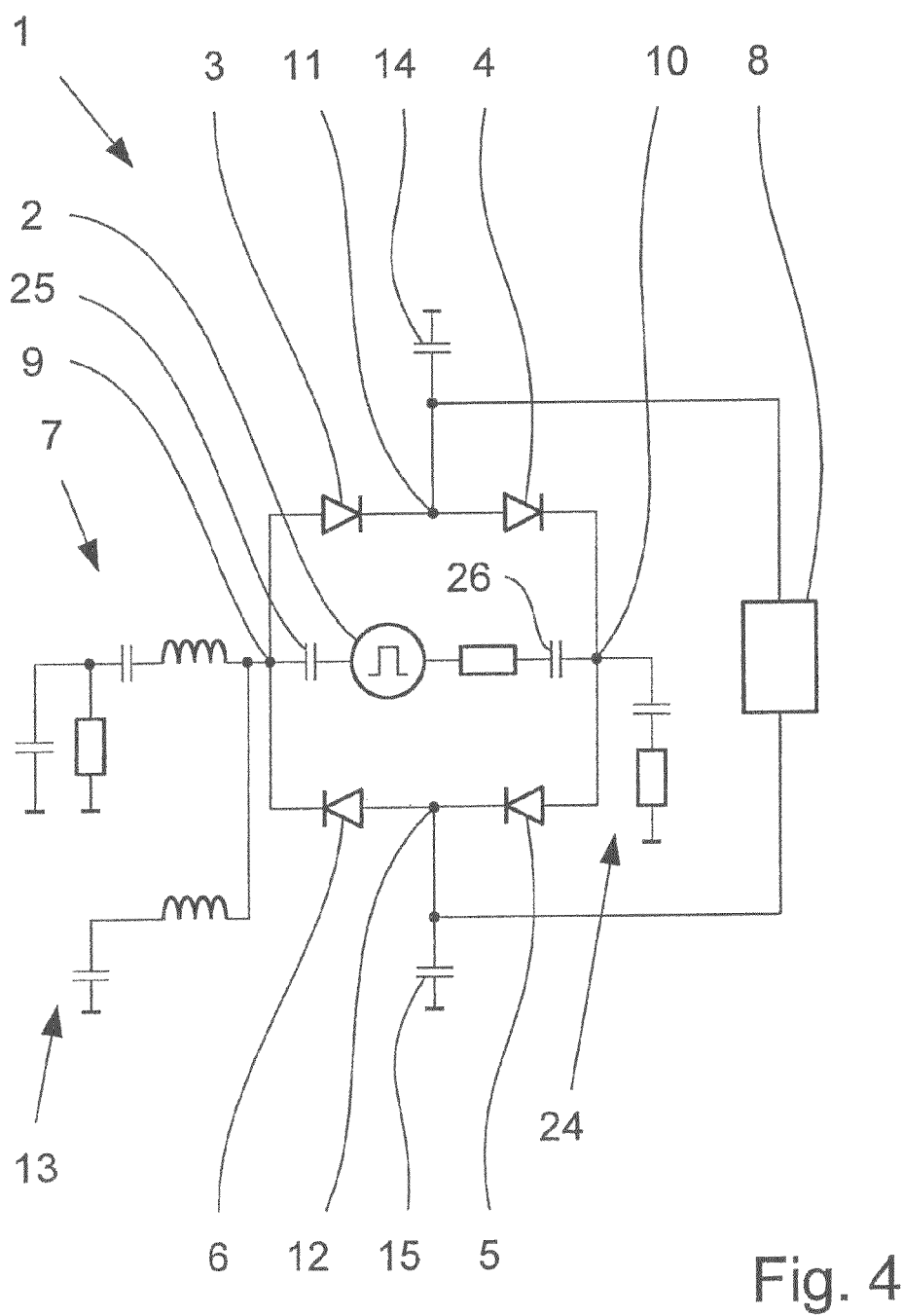
FIG. 4 shows a further exemplary embodiment of an admittance meter of the invention with a reference resonator.
Figure 5:
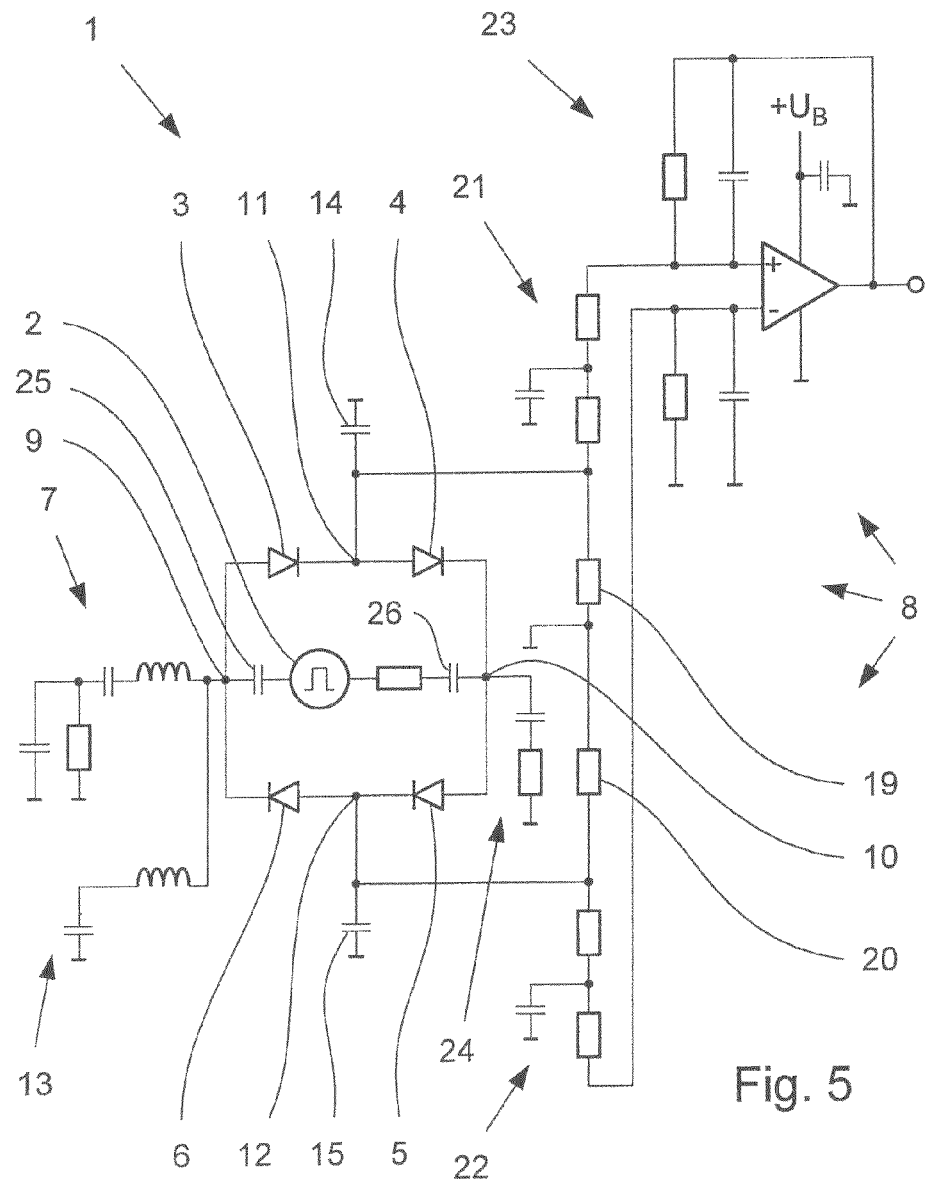
FIG. 5 shows a further exemplary embodiment of an admittance meter of the invention with an evaluation unit shown in detail.

In FIGS. 4 and 5, it is shown that the admittance meter 1 has a reference resonator 13, which is connected to the first feed point 9 of the diode ring. Like the measuring sensor 7 embodied as a resonator, this reference resonator 13 manipulates the amplitude response of the resonator currents detected, and the reference resonator 13, at its resonant frequency, likewise exhibits an excessive increase in current.

Figure 6A:
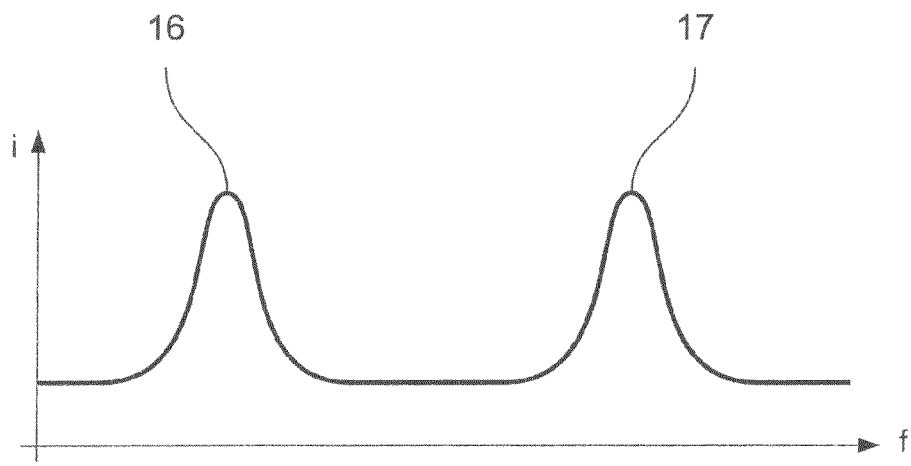
FIGS. 6a, 6b are illustrations of the amplitude response of the resonator current and resonator voltage, in the case of a reference resonator (FIG. 6a) connected to the first feed point and a reference resonator (FIG. 6b) connected to the second feed point.

In FIG. 6a, the amplitude response of all the resonator currents, that is, the resonator current of the measuring sensor embodied as a resonator and that of the reference resonator, is shown. The bell curve 16 pertains to the reference resonator 13, and the bell curve 17 pertains to the measuring sensor 7 embodied as a resonator. The resonant frequency of the reference resonator 13 is selected such that it is not located within the expected frequency range of the resonant frequency of the measuring sensor 7, and the resonant frequencies of the measuring sensor 7 embodied as a resonator are dependent on the state of manipulation of the measuring sensor.

By means of the reference resonator 13, which in the present cases can essentially not be manipulated from outside, it is for instance possible to recognize changes in the behavior of the admittance meter 1 that cannot have been engendered by external manipulation of the admittance meter 1 or the measuring sensor 7. The bell curve 16 engendered by the reference resonator 13 therefore serves as a normal for assessing the other detected bell curves 17 of the amplitude response ascertained by the evaluation unit 8.

Figure 6B:
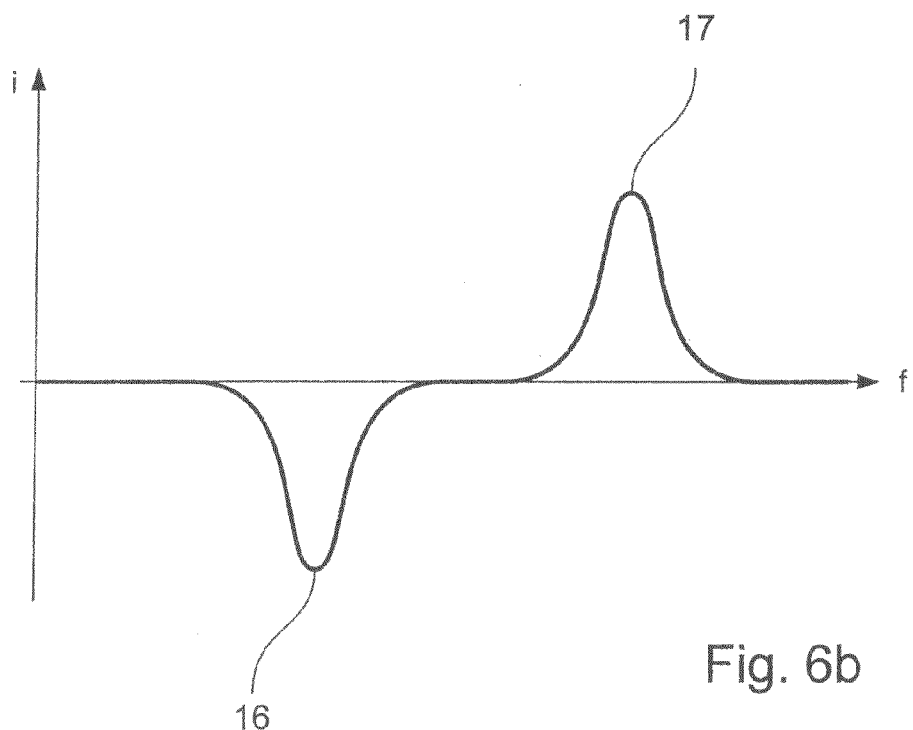

In other exemplary embodiments—not shown here—the reference resonator is connected to the second feed point of the diode ring, which in principle leads to the amplitude response shown in FIG. 6b. The reference resonator provided at the second feed point results in the downward-pointing bell curve 16 that extends into negative resonator currents, and the measuring sensor embodied as a resonator results in the upward-pointing bell curve 17. However, this embodiment involves the disadvantage that upon a conversion of the current signals, or of voltage signals derived from them, a markedly wider range of values must be covered, which is at the cost of the attainable precision, if an analog/digital converter with the same bit resolution is always selected.

Figure 8:
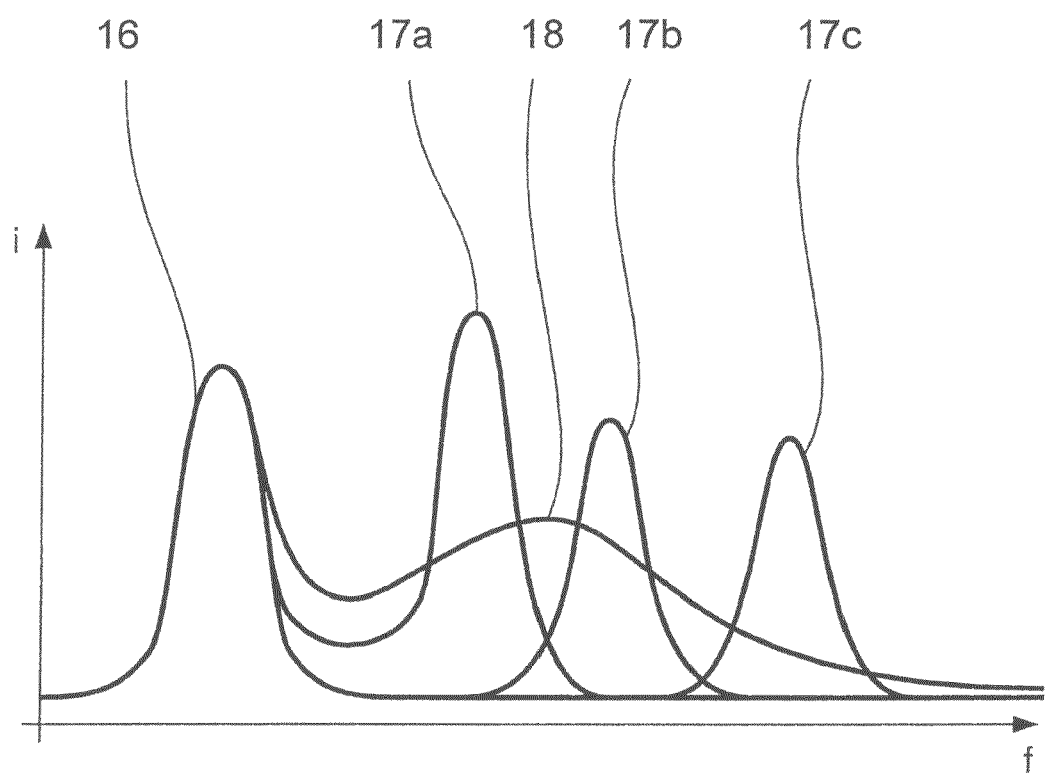
FIG. 8 shows the amplitude responses detected in various media and an example for FIG. 8a, the manipulation of the proportion of oil in a coolant lubricant, and an example for FIG. 8b, the manipulation of the degree of contamination of a coolant lubricant.

Finally, in FIG. 8, the amplitude response of the total resonator current for various states of manipulation of the measuring sensor 7 embodied as a resonator is shown. The amplitude responses 17a, 17b and 17c result from various states of manipulation of one and the same measuring sensor 7. In the examples shown, the volume to be detected—such as that of a tank—is filled completely—in other words, with a large volume—with air (curve 17c), water (curve 17b), and a highly adhesive medium—in this case, catsup (curve 17a). It can readily be seen that the quality of the resonator expressed in the amplitude responses 17a, 17b, 17c does not worsen when the surroundings of the measuring sensor 7 are large in volume, but instead is preserved almost as is.

Figure 8A:
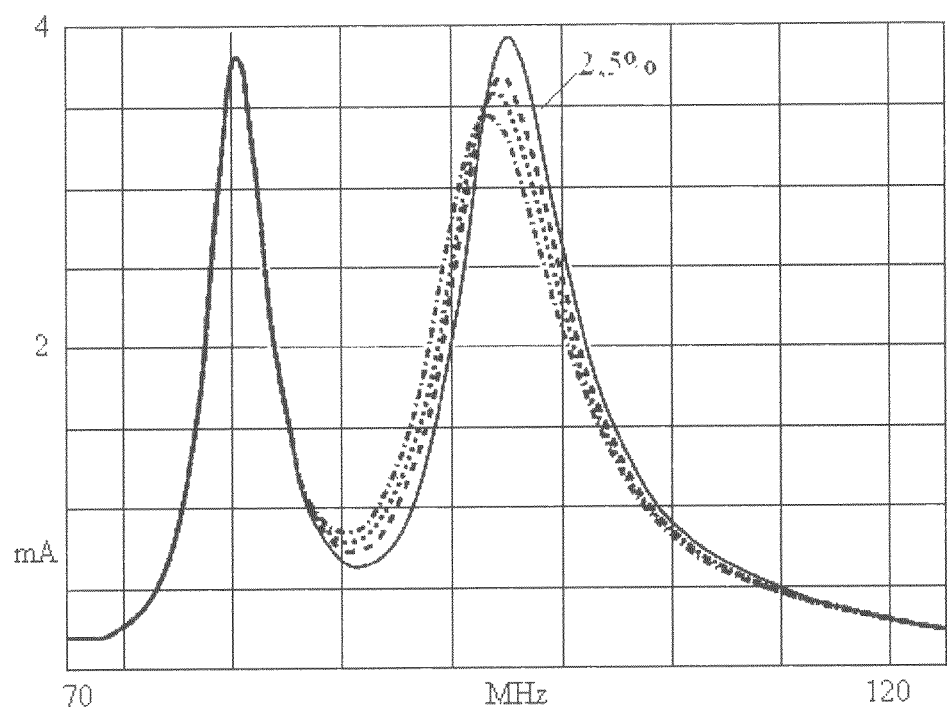

FIG. 8a shows one example for the manipulation of the proportion of oil in a coolant lubricant emulsion on the bell curves measured. The proportion of oil in a coolant lubricant emulsion varies from between 2.5% and 10%. Measurements were done at 2.5%, 5%, 7.5%, and 10%. It can be seen that the amplitude of the useful signal decreases with an increasing proportion of oil. At the same time, the resonant frequency decreased. The reference signal on the left-hand side remained constant, as expected.

By comparison of the measured bell curve with a bell curve stored in memory, a conclusion can be drawn about the proportion of oil in the coolant lubricant that is present.

Figure 8B:
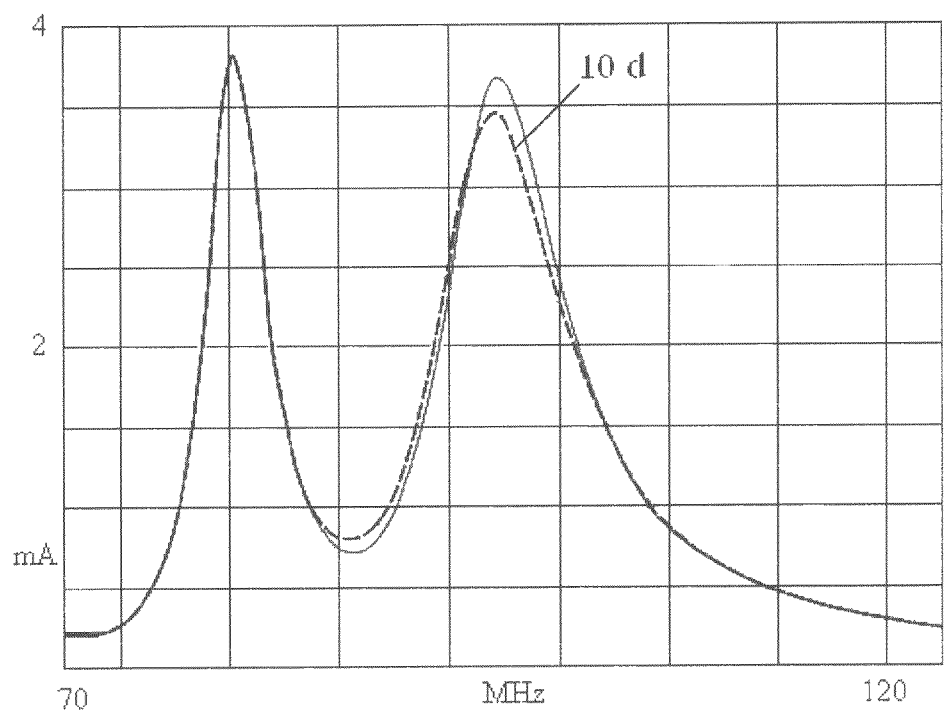

FIG. 8b shows an example for the manipulation of contamination of a coolant lubricant emulsion on the measured bell curves. A coolant lubricant emulsion with a 5% proportion of oil was used. The contamination was due to operation for 10 weeks. Here as well, the amplitude decreased. The resonant frequency varied only slightly.

By comparison of the measured bell curve with a bell curve stored in memory, a conclusion can be drawn about the degree of contamination of the coolant lubricant that is present.

Deviations in the amplitude or the resonant frequency between the bell curves measured and those stored in memory can be output as an analog signal or, if a predetermined threshold value is exceeded, as a binary switching signal. In this way, both the instantaneous state of the coolant lubricant and a requisite replenishment, to the point of a prediction of how long it can still be expected to be usable, can be signaled.

In fill level measurement technology, small-volume adhesions on measuring sensors 7 present a considerable problem, since the measuring sensor 7 continues to be massively manipulated by the adhering residues of the medium, yet the actual fill level no longer correlates with the signal obtained. In FIG. 8, the amplitude response 18 illustrates the behavior of the resonator when there is a major adhesion of medium, in this case a massive adhesion of catsup on the measuring sensor 7. It can be seen that adhesions of medium lead to a massive worsening in the quality of the resonator, which can be seen from the reduced maximum amplitude of the amplitude response and the slight steepness of the excessive increase in current in the resonant range. As a result, it can be stated that with the measuring sensor 7 embodied as a resonator, a very good distinction can be made between the type of manipulation and the medium doing the manipulation.

Figure 3:
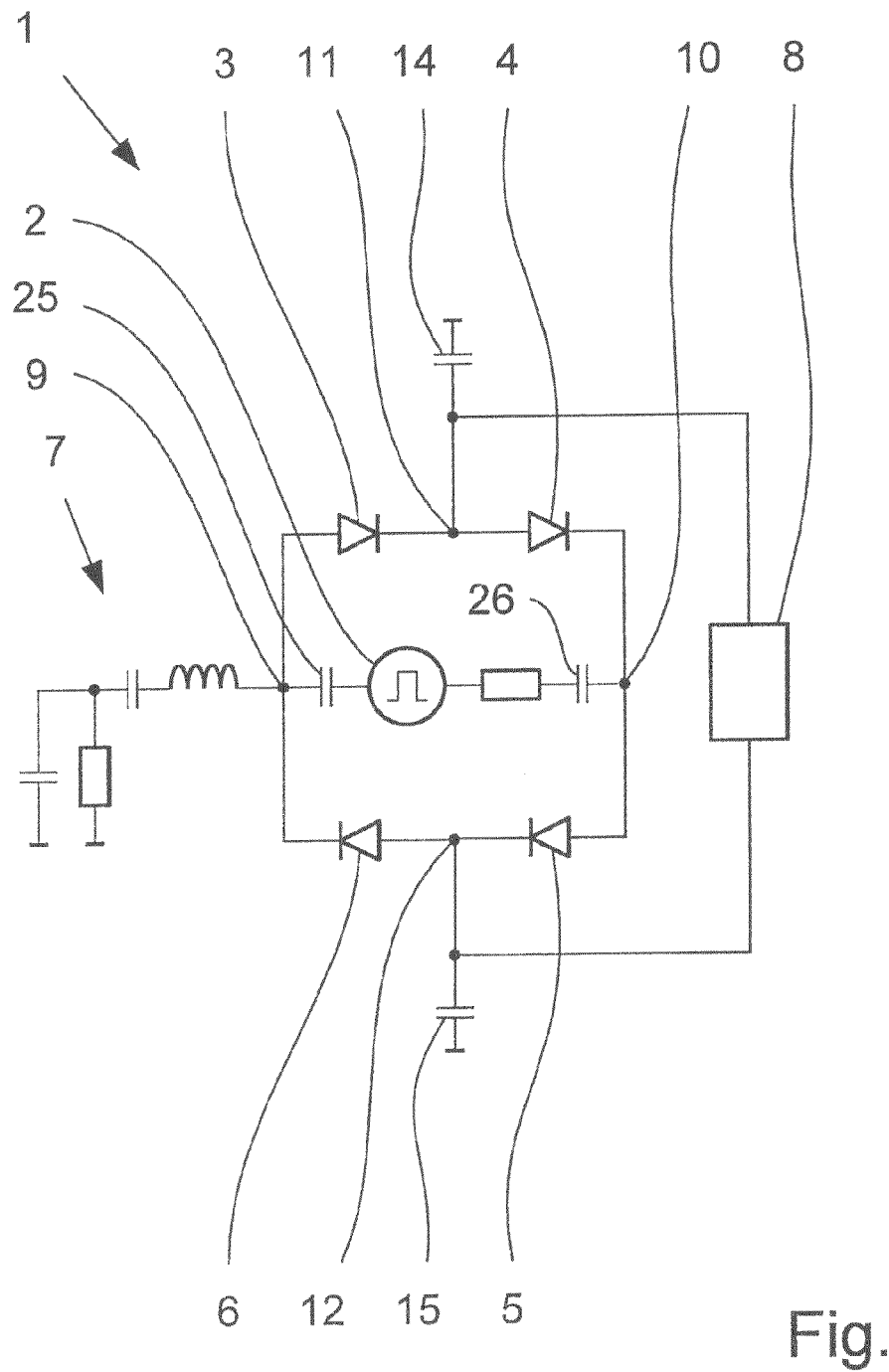
FIG. 3 shows an exemplary embodiment of an admittance meter with a detailed view of the resonator and of the alternating signal source.

In each of FIGS. 3, 4 and 5, it is shown that the evaluation unit 8 is connected to the first measurement point 11 and to the second measurement point 12. In FIG. 5, an example of a circuit for one possible realization of the evaluation unit 8 is shown in which the evaluation unit 8 loads the first measurement point 11 of the diode ring with a first measuring resistor 19 and the second measurement point 12 of the diode ring with a second measuring resistor 20, and one terminal each of the first measuring resistor 19 and of the second measuring resistor 20 is connected to the ground of the circuit. The measured voltage dropping at the first measuring resistor 19 and the measured voltage dropping at the second measuring resistor 20 are then each carried via a low-pass filter 21, 22 and evaluated by an operational amplifier circuit 23.

In the exemplary embodiments of FIGS. 4 and 5, an offset impedance 24 is connected by its first terminal to the second feed point 10 of the diode ring, and the offset impedance 24 is connected by its second terminal to the ground of the circuit. As a result, the extent to which the alternating signal generated by the alternating signal source 2 has shifted relative to the ground potential of the circuit can be adjusted. This is of particular importance if the alternating signal source is embodied in floating fashion, as is shown for all the exemplary embodiments. To attain controllability of the frequency of the alternating signal, the alternating signal source 2 is embodied as a voltage-controlled oscillator, but other embodiments are also possible, such as a resistance-controlled, current-controlled or capacitance-controlled oscillator or a digital oscillator.

The admittance meters 1 of FIGS. 3 through 5 show that the alternating signal of the alternating signal source 2 is input capacitively into the first feed point 9 of the diode ring via a first coupling capacitor 25 and into the second feed point of the diode ring via a second coupling capacitor 26, thereby eliminating the direct voltage component of the alternating signal.

Figure 7:
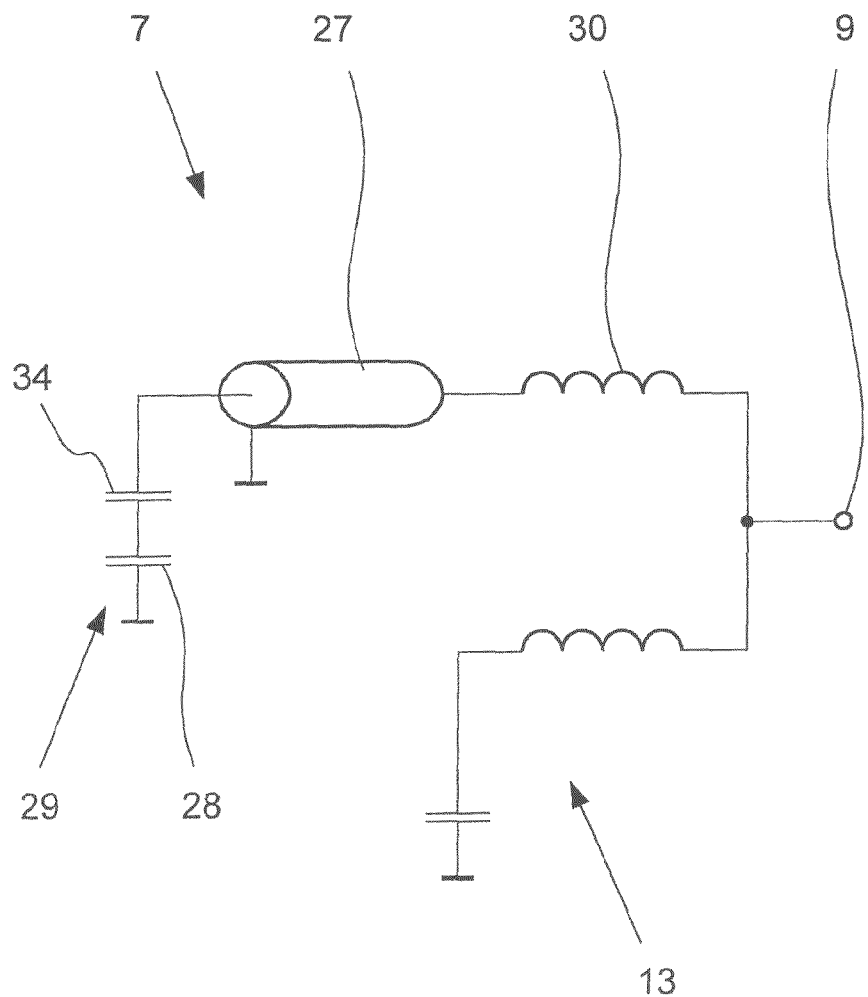
FIG. 7 shows an exemplary embodiment of the measuring sensor, embodied as a resonator, with a parallel-connected reference resonator.

In all the exemplary embodiments, the measuring sensor 7 embodied as a resonator is designed as a γ/4 resonator, which has the advantage that the resonator current, at the end connected to the first feed point 9, is maximal, and that on the end facing away from that end, a maximum resonator voltage is present. This leads to especially good evaluatability of the resonator current on the one hand and of the manipulation of the measuring sensor 7 on the other. By means of the γ/4 resonator, a high voltage is obtained at the tip of the measuring sensor 7, and in conjunction with the highest possible operating frequency, this high voltage is especially well suited to overcoming the capacitive resistance of the housing part shown in FIG. 9 in the form of a plastic cap. The resonant frequency for the reference resonator 13 is therefore also selected to be lower than the resonant frequency of the measuring reference resonator. The current evaluation makes the device especially interference-proof. The capacitive property of a housing part, embodied for instance as a plastic cap, of the measuring sensor 7 is shown in FIG. 7 as a capacitor 34. This may for instance involve the capacitance of the housing part 31 shown in FIG. 9.

In FIG. 7, one possible embodiment of the measuring sensor 7 as a resonator and of the reference resonator 13 is shown in detail. The resonator here comprises a coaxial line 27 and an active electrode 28 of a measuring impedance 29. The counterelectrode of the active electrode 28 is formed by the surroundings of the measuring sensor 7. By means of such an arrangement, resonant frequencies extending into the gigahertz range can easily be attained.

Since the resonant frequency of the resonator depends, among other things, on the length of the coaxial line 27, but for structural reasons the coaxial line cannot have arbitrary dimensions, the resonant frequency of the resonator is adapted electrically, namely by means of a coil 30 upstream of the coaxial line 27. By means of the inductance of the coil 30, the resonant frequency of the resonator is reduced. In the exemplary embodiment shown in FIG. 7, the resonant frequency of the resonator is approximately 150 MHz, which is a frequency at which adhesions on the sensor can be well distinguished from large-volume surroundings of the sensor with medium.

Figure 9:
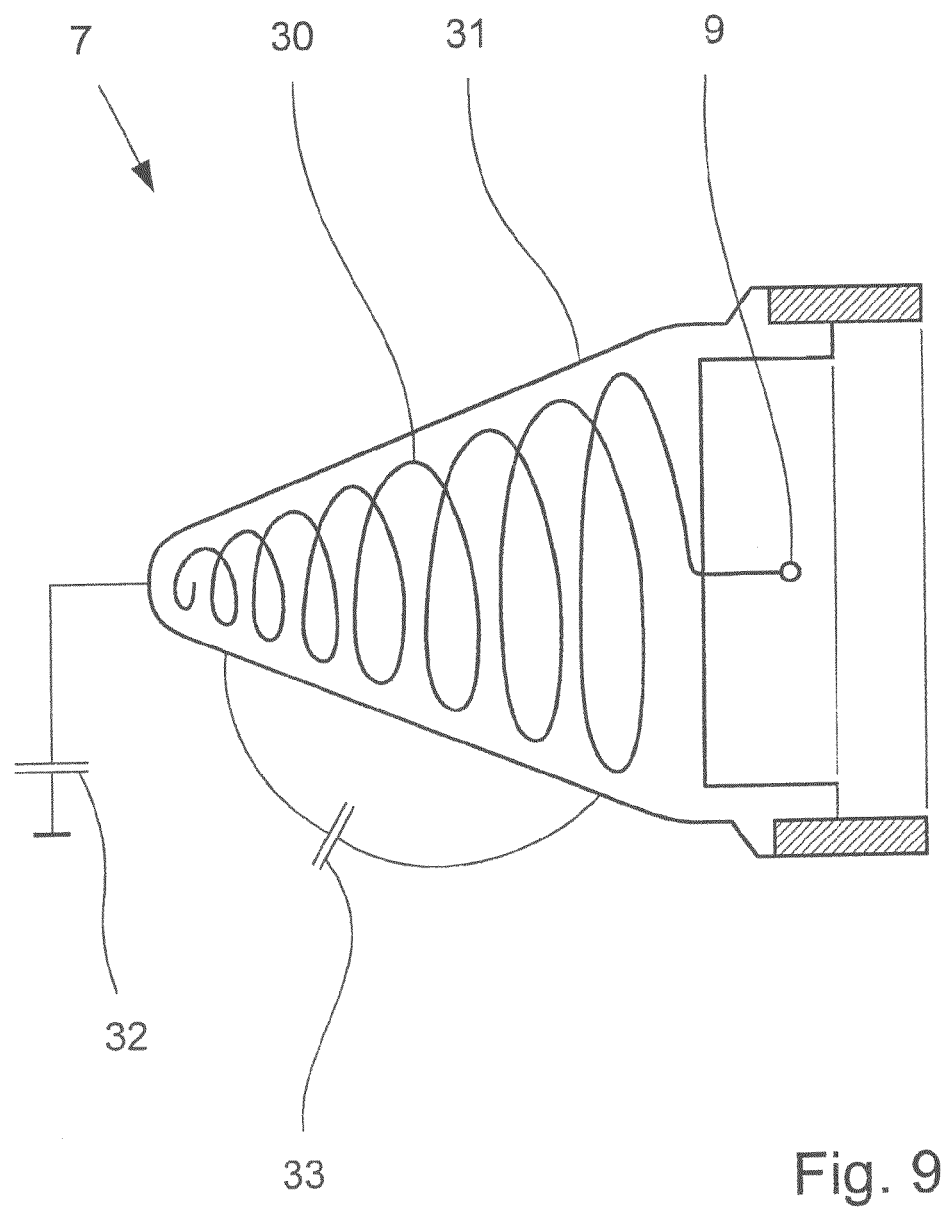
FIG. 9 shows a further concrete embodiment of the measuring sensor.

In FIG. 9, it is shown that the measuring sensor 7 embodied as a resonator can be exposed to a medium via a housing part 31. In the present case, this is accomplished by the coil 30, which is extended along the housing part 31, and is realized here specifically as a conical coil 30 in a housing part 31 embodied as a conical cap. The resonant current inside the coil is composed on the one hand of a current which is engendered by the capacitive coupling of the measuring sensor 7 to the volume that is actually of interest. This capacitive coupling is symbolized in FIG. 9 by the capacitor 32. On the other hand, an accumulation of medium on the measuring sensor 7 generates a farther capacitance, which is symbolically shown in FIG. 9 as a capacitor 33. The current engendered by this capacitor and not flowing toward ground makes no contribution to the measured current detected; in fact, it reduces the current engendered by the capacitor 32, and because of this, even more-pronounced suppression of adhesion can be ascertained by the embodiment shown of the measuring sensor than can be done solely by means of the above-described reduction in resonator quality.

In accordance with the provisions of the patent statutes, the preferred embodiment has been described. However, it should be noted that the alternate embodiments can be practiced otherwise than as specifically illustrated and described.

The invention claimed is:

1. An admittance meter comprising:
    a diode ring operated as a synchronous rectifier including at least four diodes connected in series and in the same direction in succession, first and second feed points, and first and second measuring points, the first and second feed points being interconnected via two of the diodes, the first measurement point being connected via one of the diodes to the first feed point, second measurement point being connected via another one of the diodes to the second feed point;
    an alternating signal source connected to the first and second feed points;
    an evaluation unit connected to one of the first and second measurement points; and
    a measuring sensor connected to the first feed point and embodied as a resonator.

2. The admittance meter as defined by claim 1, wherein the measuring sensor operates at a resonant frequency, and in particular a frequency range that includes the resonant frequency of the resonator in an undamped state and resonant frequencies of the resonator in a damped state.

3. The admittance meter as defined by claim 1, wherein by the alternating signal source produces one of a square wave signal and a square wave signal train having a desired frequency range.

4. The admittance meter as defined by claim 1, further comprising:
   a reference resonator connected to one of the first feed point and the second feed point, and a resonant frequency of the reference resonator differs from a resonant frequency of the measuring sensor resonator, the resonant frequency of the reference resonator is adjustable, and the resonant frequency of the reference resonator is lower than the resonant frequency of the measuring sensor resonator.

5. The admittance meter as defined by claim 1, wherein:
   the evaluation unit is embodied as a current measuring circuit adapted to evaluate one of the maximum currents and the frequency response of the maximum currents;
   the first measurement point is connected to ground via a first capacitor; and
   the second measurement point is connected to ground via a second capacitor.

6. The admittance meter as defined by claim 1, wherein:
   the evaluation unit loads one of the first measurement point with a first measuring resistor and loads the second measurement point with a second measuring resistor; and
   the evaluation unit being adapted to evaluate a measuring voltage drop at one of the first measuring resistor and a measuring voltage drop at the second measuring resistor.

7. The admittance meter as defined by claim 1, wherein:
   an offset impedance is connected by a first terminal to the second feed point, and by a second terminal to ground.

8. The admittance meter as defined by claim 1, wherein:
   the alternating signal source is one of a resistance-controlled oscillator, voltage-controlled oscillator, current-controlled oscillator, and capacitance-controlled oscillator; and
   the alternating signal source is realized in floating fashion; and
   the alternating signal source is connected to the first feed point via a first coupling capacitor, and is connected to the second feed point via a second coupling capacitor.

9. The admittance meter as defined by claim 1, wherein the measuring sensor resonator is embodied as a γ/4 resonator.

10. The admittance meter as defined by claim 1, wherein the measuring sensor resonator comprises:
    a coaxial line;
    an active electrode of a measuring impedance; and
    a coil in series with the coaxial line.

11. The admittance meter as defined by claim 10, wherein:
    the measuring sensor resonator is exposable to a medium via a housing part in the form of a conical cap; and
    the coil is a conical coil located in and extending along the housing part.

12. A method for admittance measurement of a medium, comprising the steps of:
    assembling a circuit that includes a diode ring operated as a synchronous rectifier including at least four diodes connected in series and in the same direction in succession, first and second feed points, and first and second measuring points, the first and second feed points being interconnected via two of the diodes, the first measurement point being connected via one of the diodes to the first feed point, second measurement point being connected via another one of the diodes to the second feed point, an alternating signal source connected to the first and second feed points, an evaluation unit connected to one of the first and second measurement points, and a measuring sensor resonator connected to the first feed point; and
    using the circuit to determine the proportion of oil present in the medium by comparing a measured bell curve with a reference bell curve.

13. The method of claim 12 further comprising the step of:
    determining a degree of contamination present in the medium by comparing a measured bell curve with the reference bell curve.

14. The method of claim 12 further comprising the step of:
    producing an analog signal representing deviations in one of the amplitude and the resonant frequency between the measured bell curve and the reference bell curve.

15. The method of claim 12 further comprising the step of:.
    determining a magnitude of deviations in one of the amplitude and the resonant frequency between the measured bell curve and the reference bell curve; and
    producing a binary switching signal if a said magnitude is greater than a reference magnitude.

* * * * *